United States Patent
Shah et al.

(10) Patent No.: US 9,001,821 B1
(45) Date of Patent: Apr. 7, 2015

(54) PRE-PROVISIONING BEARER CONNECTION WITH TARGET BASE STATION IN RESPONSE TO END OF CALL SERVED BY NEARBY BASE STATION OF OTHER ACCESS NETWORK

(71) Applicant: Sprint Spectrum L.P., Overland Park, KS (US)

(72) Inventors: Maulik K. Shah, Overland Park, KS (US); Jasinder P. Singh, Olathe, KS (US); Deveshkumar Rai, Overland Park, KS (US); Naresh Madineni, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 79 days.

(21) Appl. No.: 13/784,303

(22) Filed: Mar. 4, 2013

(51) Int. Cl.
*H04L 12/66* (2006.01)
*H04W 36/14* (2009.01)

(52) U.S. Cl.
CPC .................................. *H04W 36/14* (2013.01)

(58) Field of Classification Search
USPC ................ 370/331–333, 352–356; 455/432.1–432.3, 435.1–444
See application file for complete search history.

(56) References Cited

U.S. PATENT DOCUMENTS

| 8,200,236 | B2 | 6/2012 | Ekstrom et al. | |
| 2010/0232393 | A1 | 9/2010 | Shuai et al. | |
| 2010/0304749 | A1* | 12/2010 | Dwyer et al. | 455/443 |
| 2012/0028661 | A1 | 2/2012 | Fang et al. | |
| 2013/0137436 | A1* | 5/2013 | Lee et al. | 455/437 |
| 2013/0150054 | A1* | 6/2013 | Axmon et al. | 455/440 |
| 2014/0018079 | A1* | 1/2014 | Xing et al. | 455/437 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401, V9.10.0 (Sep. 2011).

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 10.3.1 Release 10)," ETSI TS 123 272, V10.3.1 (Apr. 2011).

* cited by examiner

*Primary Examiner* — Allahyar Kasraian

(57) ABSTRACT

A method and system to help manage transition of a device between wireless access networks. The device engages in a call served by a given access network and the call ends. Responsive to the call ending, (i) a determination is made as to which base station of that network last served the device, (ii) the determined base station is mapped to a proximate base station of another access network, and (iii) a bearer connection is established in the other access network with the proximate base station in anticipation of the device seeking to be served by that base station.

18 Claims, 4 Drawing Sheets

PRE-PROVISIONING BEARER CONNECTION WITH TARGET BASE STATION IN RESPONSE TO END OF CALL SERVED BY NEARBY BASE STATION OF OTHER ACCESS NETWORK

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or radio access technology, with communications from the base stations to WCDs defining a downlink or forward link and communications from the WCDs to the base stations defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for registration of WCDs, initiation of communications, handoff between coverage areas, and functions related to air interface communication.

In accordance with the air interface protocol, each coverage area may operate on one or more carrier frequencies and may define a number of air interface channels for carrying information between the base station and WCDs. These channels may be defined in various ways, such as through frequency division multiplexing, time division multiplexing, and/or code-division multiplexing for instance.

Furthermore, when a cellular wireless network serves a WCD over an air interface, the network may allocate various network resources to facilitate communication to and from the WCD. By way of example, the network may allocate a particular air interface connection, such as a dedicated air interface traffic channel or a logical radio-connection identifier, for use to support air interface communications between the WCD and a serving base station. Further, the network may allocate a backhaul bearer connection, such as a dedicated backhaul channel or logical backhaul bearer identifier, for use to support backhaul communications for the WCD. Such a backhaul bearer connection may extend between the serving base station and a switch or gateway, for instance, or between various other network components.

OVERVIEW

In some areas, service providers may operate a hybrid wireless communication system that includes at least two radio access networks (RANs) and functionality to interwork between the RANs. In such an arrangement, a WCD may acquire connectivity with and be served by one of the RANs and may at some point transition to instead connect with and be served by another of the RANs. When this transition occurs, the first RAN may release certain network resources that the RAN had allocated for use to serve the WCD, and the second RAN may instead allocate certain resources for use to serve the WCD.

An example of such a hybrid wireless communication system is one that includes a first RAN providing LTE service to support mobile broadband communication and a second RAN providing legacy CDMA or GSM service to support traditional voice calls. In such a system, service providers may implement "circuit switched fallback" (CSFB) functionality, which allows WCDs to operate by default on the LTE network and to conveniently transition over to the legacy CDMA or GSM network when necessary to place or receive traditional voice calls.

With such an arrangement, a WCD may connect with and be served by the LTE network over an LTE air interface, and the LTE network may thus allocate certain air interface and backhaul connections for the WCD. When the WCD then seeks to place a voice call or the legacy CDMA or GSM network seeks to connect a voice call to the WCD, the WCD may then engage in signaling with the legacy network through the LTE network so as to set up the call and legacy network service and may then seamlessly transition over to connect with and be served with the call by the legacy network. In this process, the legacy network may newly assign certain air interface and backhaul bearer connections for the WCD, and the LTE network may release the air interface and backhaul connections that it had allocated for the WCD. In turn, once the WCD finishes engaging in the CSFB call served by the legacy network, the WCD may then transition back to being served by the LTE network. And in this process, the legacy network may release the air interface and backhaul bearer connections that it had allocated for the WCD, and the LTE network may newly assign air interface and backhaul bearer connections for the WCD.

In any cellular wireless system, it may take some time for a WCD to initially acquire connectivity with a RAN, as the RAN works to allocate resources for the WCD. When a WCD first powers on in coverage of a RAN, this delay may pose no issue, as it may be viewed as a normal part of the power-on process. However, in a hybrid wireless communication system where a WCD moves from being served by one network to being served by another network, it may be desirable to minimize this delay, to help provide a good user experience.

In a CSFB arrangement as described above, the transition from being served by the LTE network to being served with the call by the legacy network may be largely seamless, as the WCD may engage in call setup signaling through the LTE network to set up the call and legacy network service before then transitioning over to be served by the legacy network. However, when the CSFB call ends, there may be noticeable delay as the WCD then transitions back to being served by the LTE network. In particular, as the LTE network had released the air interface and backhaul bearer connections that it had allocated for the WCD, the LTE network may need to go through a process of reallocating those resources, and the associated signaling between LTE network entities may take some time.

One solution to this problem may be to have the LTE network simply suspend, rather than release, the connections that the LTE network had allocated for the WCD when the WCD transitions to be served by the legacy network. That way, when the WCD ends its CSFB call and returns to be served by the LTE network, the LTE network may simply resume use of the allocated connections, making the transition fairly seamless.

Unfortunately, however, a further problem can arise with such a process if the WCD has physically moved to another location during the course of its CSFB call. In that case, when the WCD transitions back to be served by the LTE network, the WCD may no longer be in coverage of the LTE base station that was serving the WCD before the CSFB call but may instead be in coverage of a new LTE base station. Consequently, the bearer connection that the LTE network had in place between the previously serving base station and a gateway, for instance, may no longer be of use. Rather, when the WCD transitions back to LTE and seeks to connect with the new LTE base station, the LTE network may then need to allocate a new bearer connection between that new base station and the gateway, or transfer the existing bearer connection to be between the new base station and the gateway. And again, the associated signaling may take some time.

Disclosed herein is a method and system to help avoid problems such as this. In accordance with the disclosure, when a WCD engages in a call served by a particular access network and the call ends, a determination will be made as to which base station of that particular access network last served the WCD, and a location of that base station will then be used as a basis to identify a nearby base station of another access network. The other network will then pre-provision a bearer connection with that identified nearby base station in anticipation of the WCD seeking to be served by that nearby base station. In turn, when the WCD then seeks to be served by the identified nearby base station, the pre-provisioned bearer connection can conveniently be used to serve the WCD.

Accordingly, in one respect, disclosed is a method operable in a hybrid wireless communication system that includes a first access network and a second access network. In accordance with the method, the first access network provides connectivity with at least one transport network. Further, the second access network serves a WCD with a call, and the call end. In response to the call ending, the method then involves (i) determining which base station of the second access network most recently served the WCD, (ii) using a location of the determined base station as a basis to identify a nearby base station of the first access network, and (iii) the first access network pre-provisioning for the WCD a bearer connection with the identified base station before the WCD then requests to be served by the identified base station (e.g., before the first access network receives and processes such a request). In turn, the method then involves wirelessly receiving into the identified base station of the first access network, from the WCD, a request for the WCD to be served by the identified base station, and granting the request. Advantageously, the pre-provisioned bearer connection with the identified base station may then be used in serving the WCD.

In another respect, disclosed is a method operable in a wireless communication system that includes a first RAN having a plurality of first base stations operating according to a first air interface protocol and a second RAN having a plurality of second base stations operating according to a second air interface protocol. In accordance with the method, the first RAN serves a WCD, with communications flowing between the WCD and a gateway of the first RAN via a given one of the first base stations and a bearer connection between that given first base station and the gateway, and the gateway has a record of the bearer connection pointing to the given first base station. The method involves, while the first RAN is serving the WCD, the second RAN setting up a call for the WCD, and (i) the WCD then transitioning from being served by the first RAN to being served with the call by the second RAN and (ii) the first RAN suspending the bearer connection.

In accordance with the method, the method then involves the call ending, and, in response to the call ending, (a) determining which second base station last served the WCD with the call and mapping the determined second base station to a new first base station of the first RAN based at least in part on the new first base station being located proximate to the determined second base station and (b) the first RAN updating the record of the bearer connection at the gateway to point to the new first base station instead of to the given first base station, before then receiving a request from the WCD to attach with the new first base station. In turn, the method involves, upon receiving the request from the WCD to attach with the new first base station, the first RAN (i) provisioning the new first base station with a record of the bearer connection pointing to the gateway, (ii) granting the request to attach, and (iii) using the bearer connection between the new first base station and gateway in serving the WCD.

Still further, in another respect, disclosed is a hybrid wireless communication system that includes a first RAN having a plurality of first base stations configured to serve WCDs according to a first air interface protocol, and a second RAN having a plurality of second base stations configured to serve WCDs according to a second air interface protocol. The first RAN has a serving gateway configured to exchange packet data with served WCDs over bearer connections between the gateway and the first base stations, and a first control server configured to set up the bearer connections for WCDs. And the second has a second control server for controlling calls served by the second RAN.

In this hybrid wireless communication system, when the second RAN serves a given WCD with a call and the call ends, the hybrid wireless communication system responds to the ending of the call at least in part by (a) determining which second base station last served the given WCD with the call, (b) identifying a first base station based at least in part on proximity of the first base station to the determined second base station, and (c) pre-provisioning the gateway with a bearer connection to the identified first base station in anticipation of the identified first base station receiving an attach request from the given WCD.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of a network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
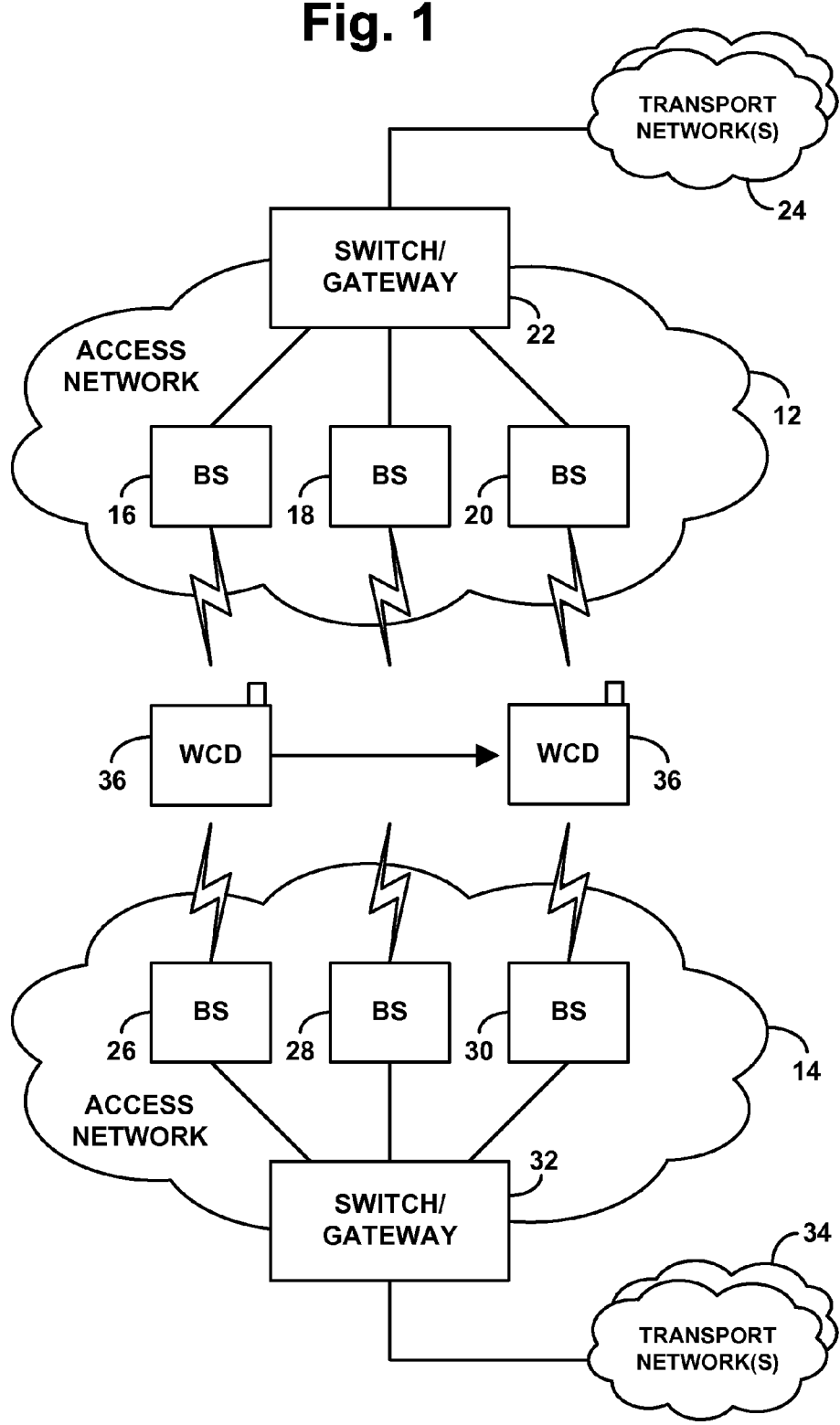
FIG. 1 is a simplified block diagram of a network arrangement in which aspects of the present disclosure can be implemented.

The arrangement of FIG. 1 includes by way of example two representative access networks 12, 14, each of which may function to provide WCDs with air interface coverage and connectivity with one or more transport networks such as the PSTN and the Internet. As such, each access network may include multiple base stations that radiate to define coverage in which WCDs may operate, and the base stations may be communicatively linked with one or more switches or gateways that provide connections in turn with one or more transport networks.

In the example arrangement shown, for instance, access network 12 includes three representative base stations 16, 18, 20, each having a communication link with a switch or gateway 22 that connects in turn with one or more transport networks 24. Likewise, access network 14 includes three representative base stations 26, 28, 30, each having a communication link with a switch or gateway 32 that connects in turn with one or more transport networks 34.

Numerous variations from this arrangement are possible, however. For instance, either access network may include a different number of base stations, though each access network preferably includes two or more base stations. Further, either access network may include more than one switch or gateway and may include various components between each switch or gateway and the transport network(s). Moreover, although a line is shown connecting each base station with the switch or gateway of its access network, the links between each base station and the switch or gateway may include various other components and could all be provided over a packet-switched network or other connection mechanism. Other variations are possible as well.

Each of these access networks may operate according to a respective air interface protocol, such as any of those noted above for instance. By way of example, network 12 might be an LTE network, and network 14 might be a CDMA or GSM network. Alternatively, both networks could operate according to the same air interface protocol. For instance, both networks could operate according to LTE, or both networks could operate according to CDMA or some other air interface protocol.

In practice, each of the illustrated base stations will be located at a particular location, and its coverage may correspond with that location. Each base station, for instance, may be a macro-network base station positioned at a fixed location and providing fairly wide coverage from that location. Alternatively, any of the base stations may be a portable femtocell or picocell base station that is currently located at a particular location and may provide more restricted coverage from that location.

The location of each base station may be represented by geographic coordinates, such as latitude/longitude coordinates for instance, and the geographic coordinates of the various base station may be recorded in a data table accessible to one or more other components of the system. In accordance with the present disclosure, such a table or associated data may correlate particular base stations of network 12 with particular base stations of network 14, based on proximity of the base stations. For instance, the table may specify that base station 16 of network 12 is nearby base station 26 of network 14, that base station 18 of network 12 is nearby base station 28 of network 14, and that base station 20 of network 12 is nearby base station 30 of network 14. Such correlation data may be keyed to the locations of the base stations themselves and/or to the locations where coverage of the base stations is deemed to exist.

FIG. 1 further depicts a representative WCD 36 moving from one location to another, and particularly moving from a location where the WCD is within coverage of base stations 16 and 26 to a location where the WCD is within coverage of base stations 20 and 30. This WCD may take various forms, examples of which include a cell phone, wirelessly-equipped personal computer or tablet computer, in-vehicle communication module, wireless tracking device, or other type of wireless communication device now known or later developed.

In practice with this arrangement, WCD 36 may be registered with network 14 and may engage in a call (e.g., voice call, voice over Internet Protocol (VoIP) call, data communication session, or the like) served by network 14. For instance, the WCD may engage in a call with a remote entity (not shown) on a representative transport network 14.

Further, as the WCD engages in this call, the WCD may be served by various ones of the illustrated base stations of network 14. For instance, the WCD may begin the call while served by base station 26, the WCD may hand off mid-call from being served by base station 26 to being served by base station 28, and the WCD may then hand off mid-call from being served by base station 28 to being served by base station 30. The WCD may then end the call while being served by base station 30. As the WCD hands off from being served by one base station of network 14 to being served by another base station of network 14, an entity of network 14, such as switch or gateway 32, may keep a record of the handoff and of the base station that is currently serving the WCD.

In line with the present disclosure, when the WCD's call served by network 14 ends, the system may automatically pre-provision an appropriate bearer connection for the WCD in network 12, to help expedite the process of the WCD then transitioning from being served by network 14 to being served by network 12. To facilitate this, in response to the WCD's call ending, a determination may be made as to which base station of network 14 most recently served the WCD, a location of that determined base station may be used as a basis to identify a nearby base station of network 12, and network 12 may then pre-provision for the WCD a bearer connection with that identified base station before the WCD then requests to be served by the identified base station.

In practice, for instance, the switch or gateway 32 may respond to the WCD's call ending by reviewing records to determine that base station 30 most recently served the WCD (e.g., that base station 30 was the base station serving the WCD when the WCD's call ended). In turn, the switch or gateway 32 or another entity of the system may then refer to correlation data such as that described above to map determined base station 30 to base station 20 of network 12 on grounds that base station 20 is the base station of network 12 that is closest to base station 30 of network 14. The switch or gateway 32 or other entity, may then respond to that mapping result by signaling to an entity of network 12 to trigger pre-provisioning of a bearer connection with base station 30 in anticipation of the WCD then seeking to be served by base station 30.

After the WCD's call ends, the WCD may then scan for and detect coverage of network 12 and seek to be served by network 12. Given the proximity of base station 30 to base station 20, the likelihood at this point would thus be that the WCD would detect coverage of base station 20 and seek to be served by base station 20. Consequently, the WCD may transmit to base station 20 of network 12 a registration or attach request or other request to be served by base station 20. And in accordance with the present disclosure, network 12 may then grant that request and conveniently make use of the pre-provisioned bearer connection with base station 20 in serving the WCD. For instance, as the base station 20 wirelessly receives bearer traffic from the WCD, the base station may conveniently transmit that bearer traffic over the pre-provisioned bearer connection to the switch or gateway 22 for output onto a transport network 24. Likewise, the base station 20 may receive from the switch or gateway 22 over the pre-provisioned bearer connection incoming bearer traffic destined to the WCD, and the base station 20 may wirelessly transmit that bearer traffic to the WCD.

The bearer connection that the system pre-provisions for the WCD in network 12 may be a physical or logical connection between the identified base station 20 and the switch or gateway 22. For example, when the bearer connection is fully established, the base station 20 may store for the WCD a context record indicating that a bearer connection exists with a particular network address or other identifier of the switch or gateway 22, and the switch or gateway 22 may store for the WCD a context record indicating that a bearer connection exists with a particular network address or other identifier of the base station 20, so that the base station and switch/gateway 22 can then exchange WCD bearer traffic with each other when serving the WCD.

Pre-provisioning such a bearer connection may then involve fully establishing or updating such context records for the WCD at both base station 20 and the switch or gateway 22. Alternatively, pre-provisioning the bearer connection may constitute just partially provisioning the bearer connection, such as by establishing or updating just part of that data. For instance, the pre-provisioning may constitute establishing or updating such a context record at the switch or gateway 22 to indicate for a bearer connection of the WCD the address or other identifier of base station 22. In turn, when the WCD then seeks to be served base station 20, network 12 may then establish or update the corresponding context record at base station, to indicate for the WCD's bearer connection the address or other identifier of the switch or gateway 22. Having the addresses or other identifiers of each other, the base station 20 and switch or gateway 22 may then exchange WCD bearer traffic over that bearer connection.

Figure 2:
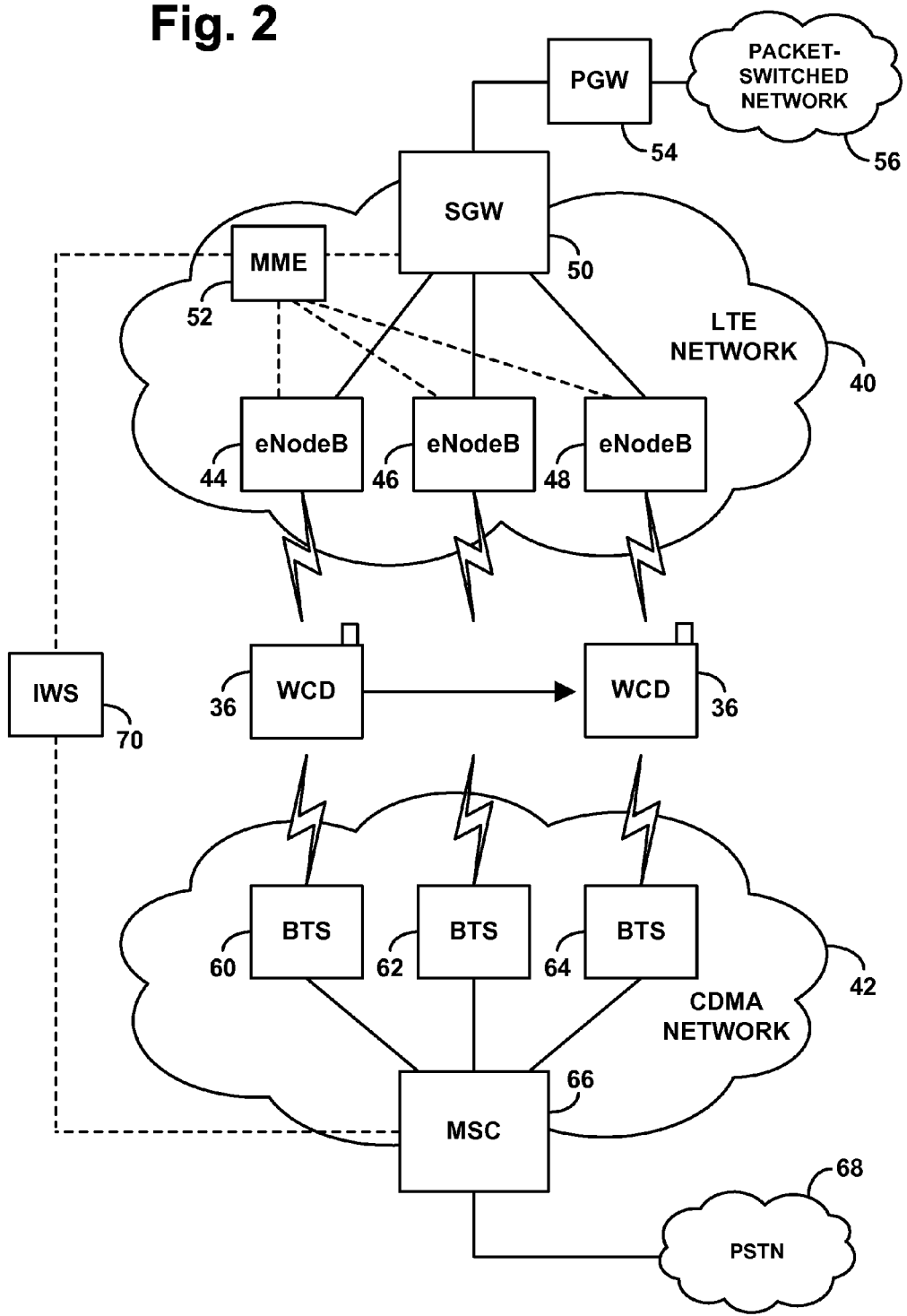
FIG. 2 is a simplified block diagram of a more specific network arrangement in which aspects of the disclosure can be implemented.

FIG. 2 is next another simplified block diagram illustrating more specifically a particular example arrangement in which this process can be implemented. In particular, FIG. 2 depicts a hybrid LTE/CDMA wireless communication system, including an LTE network 40 and a circuit-switched CDMA network 42, arranged to support CSFB operation. In such an arrangement, the present method can help to expedite return of a WCD to the LTE network 40 after the LTE finishes a call served by the CDMA network 42, as the method can operate in response to ending of the call to map the last CDMA base station that served the WCD with the call to a nearby LTE base station and to pre-provision a bearer connection in the LTE network with that nearby LTE base station in anticipation of the WCD then requesting to be served by the LTE base station.

In the arrangement of FIG. 2, the LTE network 40 is shown including three representative LTE base stations 44, 46, 48 known as eNodeBs. The eNodeBs are then each communicatively linked with a serving gateway (SGW) 50 and further with a control server 52 known as a mobility management entity (MME), and the MME is communicatively linked with the SGW. In addition, SGW 50 is further shown being communicatively linked with a packet gateway (PGW) 54, which provides connectivity with a packet-switched network 56 such as the Internet for instance.

In FIG. 2, the links between the eNodeBs and the SGW are shown as solid lines to conceptually represent links used to carry bearer traffic, and the links between the eNodeBs and the MME and between the MME and the SGW are shown as dashed lines to conceptually represent links used to carry signaling traffic. In practice, all of these links may be provided over a common packet-switched network or the like or in any other form.

With this arrangement, when a WCD enters into coverage of a given eNodeB, the WCD may normally transmit to the eNodeB an LTE attach request message seeking to be served by the eNodeB, and the eNodeB would forward the attach request to the MME. In response, the MME would then create an evolved packet system (EPS) bearer identity for the WCD and would send to the SGW a create-session request message specifying the bearer identity. The SGW would then create an entry for the WCD in an EPS bearer table that the SGW maintains, designating an address or other identifier of the serving eNodeB, and would send a create-session response to the MME. And the MME would responsively send to the eNodeB an attach-accept message providing the bearer ID (and perhaps providing the address or other identifier of the SGW), and the eNodeB would send a corresponding attach-accept message to the WCD and allocate a radio bearer identity for use by the WCD.

CDMA network 42, on the other hand, is shown including three representative base stations 60, 62, 64 known as base transceiver stations (BTSs), all of which are communicatively linked with a representative switch 66 known as a mobile switching center (MSC). MSC 66 then provides connectivity with the PSTN 68 and functions as a control server of the CDMA network 42. In practice, the communication links between the illustrated BTSs and the MSC may include various other entities, such as one or more base station controllers (BSCs) or radio network controllers (RNCs) for instance. Further, other variations are possible as well.

With the arrangement shown, when a WCD enters into coverage of a given BTS, the WCD may transmit to the BTS a registration message seeking to be served by the BTS. Once registered, the WCD may then operate in an idle mode in which the WCD periodically reads a paging channel from that BTS in search of any relevant page messages and the WCD also scans for better coverage for possible idle handoff to another base station. When the WCD seeks to initiate a call on the PSTN, the WCD may then transmit over the air to its serving BTS an origination request, the BTS may pass the request to the MSC 66, and the MSC may set up the call. Further, the BTS may assign a CDMA air interface traffic channel for use by the WCD to engage in the call, thus transitioning the WCD to an active mode. Likewise, when the MSC has an incoming call to connect to the WCD, the MSC may direct the currently serving BTS to page the WCD and, upon receipt of a page response from the WCD, may connect the call through the BTS to the WCD.

As noted, the system of FIG. 2 is arranged to support CSFB operation. As such, the system further includes an interworking server (IWS) 70 having a signaling communication link with both the MSC 66 of the CDMA network 42 and the MME 52 of the LTE network 40. (As with other communication links described herein, although these links are shown as direct links, they may include one or more intervening elements or functions as well.) In practice, for instance, the IWS 70 may conveniently facilitate setup of CDMA calls for a WCD while the WCD is served by the LTE network, so that the WCD can then seamlessly transition from being served by the LTE network to engaging in the calls served by the CDMA network. In particular, certain call setup signaling that would normally flow over the CDMA air interface between the WCD and a CDMA BTS will instead flow over the LTE air interface between the WCD and an LTE eNodeB, and that signaling will pass between the eNodeB and the MME 52, between the MME 52 and the IWS 70, and between the IWS 70 and the MSC 66.

For instance, when the WCD is being served by the LTE network, the WCD may originate a CDMA call by transmitting to its serving eNodeB an extended service request message, which would trigger signaling between the eNodeB and MME to prepare for CSFB message transmission. Further, the eNodeB may inform the WCD of CDMA network operational parameters and may direct the WCD to scan for CDMA coverage. The WCD may then scan for CDMA coverage and may transmit to the eNodeB a CDMA origination request, which the eNodeB may tunnel to the MME, the MME may tunnel to the IWS, and the IWS may tunnel to the MSC. The MSC may then direct the detected CDMA BTS to assign an air interface traffic channel for use by the WCD to engage in the call, and the MSC may return to the IWS for transmission ultimately to the WCD a traffic channel assignment message directing the WCD to use the assigned CDMA traffic channel. The WCD may the transition to engage in the call over CDMA, served by the detected CDMA BTS using the assigned CDMA traffic channel.

In this process, when the eNodeB transmits the CDMA traffic channel assignment message to the WCD, the eNodeB may then transmit to the MME a context release request message specifying CSFB as the cause, and the MME may responsively transmit to the SGW a release bearer request to trigger release of the bearer connection between the SGW and the eNodeB (e.g., clearing of the bearer entries that facilitated exchange of bearer traffic for the WCD). As a result, the bearer connection that had been established between the eNodeB and the SGW would be torn down, and the MME would consider the WCD context to be suspended.

With the arrangement of FIG. 2, the IWS 70 may function to facilitate the pre-provisioning process described above. In particular, the IWS 70 may be the network entity that includes or has access to correlation data as described above so as to map a most recently serving CDMA base station to a nearby (e.g., nearest) LTE eNodeB, and the IWS may be configured to then signal to the MME 52 to trigger pre-provisioning of a bearer connection with that eNodeB.

Figure 3:
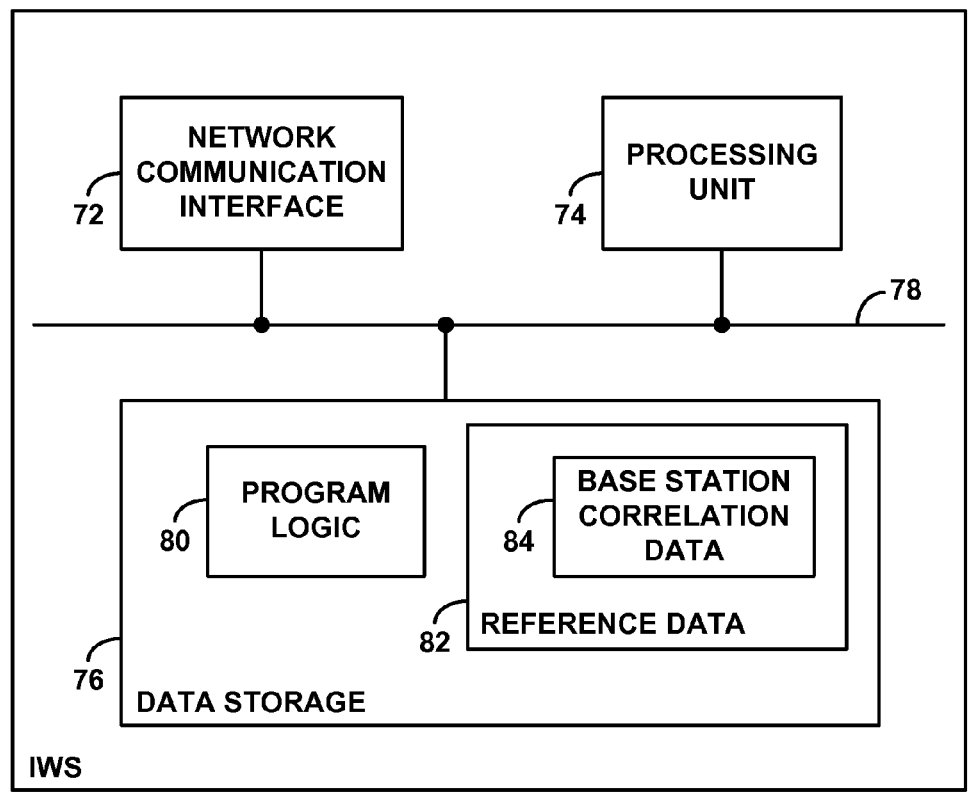
FIG. 3 is a simplified block diagram of an interworking server operable in the arrangement of FIG. 2.

FIG. 3 is a simplified block diagram depicting components that may be included in a representative IWS 70 to facilitate these functions. As shown, the IWS may include a network communication interface 72, a processing unit 74, and non-transitory data storage 76, all of which may be communicatively linked together by a system bus, network, or other communication mechanism 78.

Network communication interface 72 functions to facilitate communication with MSC 66 and with MME 52. As such, the interface 72 may include one or more network interface modules, such as Ethernet network interface modules for instance or may take any of a variety of other forms, supporting wireless and/or wired communication with these and other components.

Processing unit 74 may then comprise one or more general purpose processors (such as microprocessors) and/or one or more special purpose processors (e.g., application specific integrated circuits). And data storage 76 may comprise one or more volatile and/or non-volatile storage components, such as optical, magnetic, or flash storage, and may be integrated in whole or in part with processing unit 74. As shown, data storage 76 may include program logic 80 and reference data 82. Program logic may comprise program instructions that are executable or interpretable by processing unit 74 to carry out various IWS functions described herein. And reference data 82 may comprise data used by that program logic, such as the base station correlation data 84 as noted above.

Figure 4:
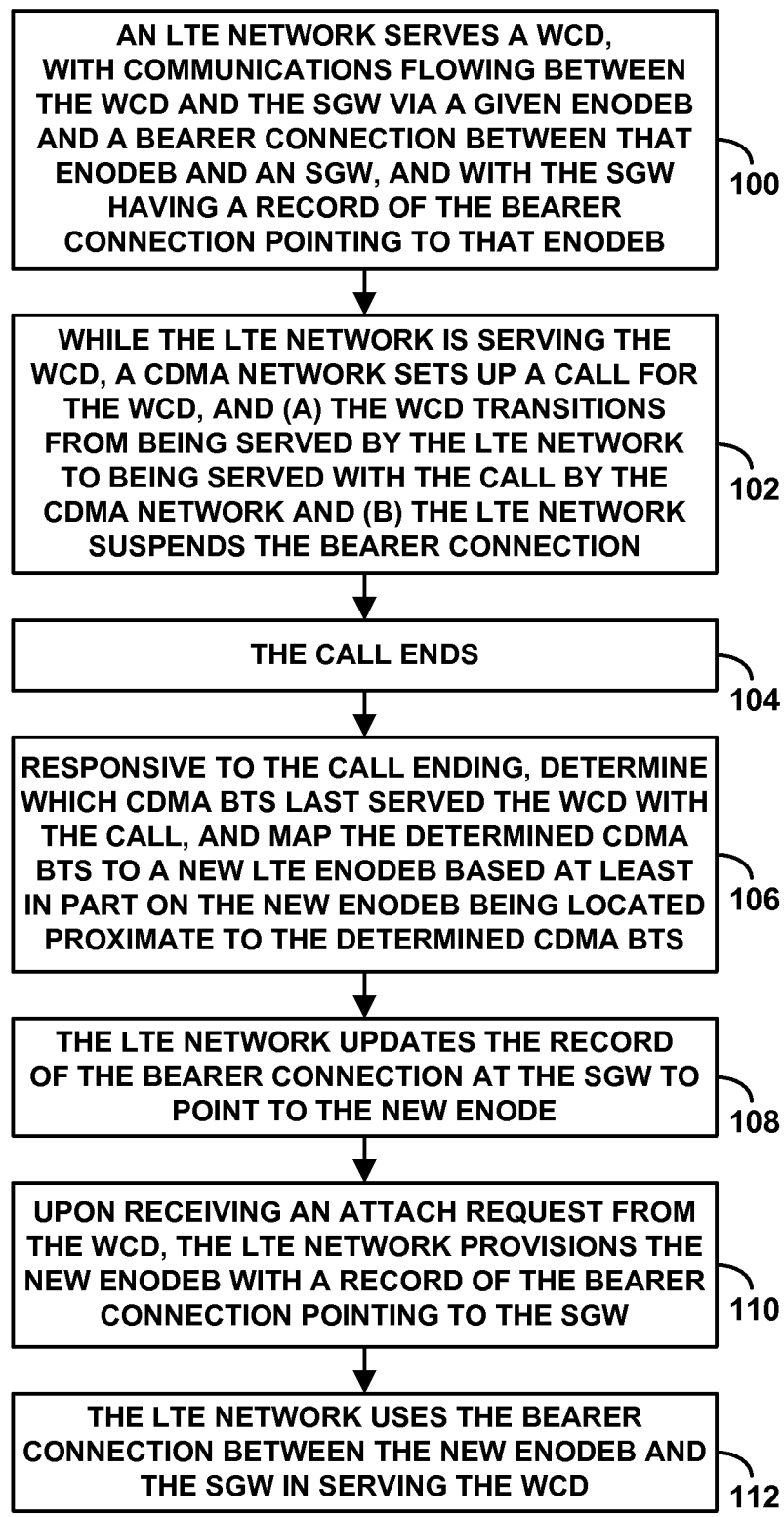
FIG. 4 is a flow chart depicting functions that can be carried out in accordance with the present disclosure.

FIG. 4 is next a flow chart depicting functions that can be carried out in an example wireless communication system that includes a first RAN having a plurality of first base stations operating according to a first air interface protocol and a second RAN having a plurality of second base stations operating according to a second air interface protocol. By way of example and without limitation, the flow chart assumes that the system is arranged as shown in FIG. 2, with the first RAN being the LTE network 40 and the second RAN being the CDMA network 42. The functions depicted and described could be applied in other contexts as well.

As shown in FIG. 4, at block 100, the method involves the LTE network 40 serving a WCD, with communications flowing between the WCD and the SGW 50 via a given one of the eNodeBs and a bearer connection between that eNodeB and the SGW, and with the SGW having a record of the bearer connection pointing to that eNodeB. For example, the WCD may be served by eNodeB 44, and a bearer connection may exist between eNodeB 44 and the SGW 50, with each of those nodes having a record of the other, so as to facilitate exchange of WCD bearer traffic.

At block 102, the method then involves, while the LTE network 40 is serving the WCD, the CDMA network 42 setting up a call for the WCD (e.g., to or from the WCD), and (a) the WCD then transitioning from being served by the LTE network to being served with the call by the CDMA network and (b) the LTE network suspending the bearer connection. For example, while eNodeB 44 is serving the WCD, the WCD may originate a CSFB call or the CDMA network may page the WCD to set up a CSFB call, and in either case setup signaling for the call may pass between the WCD and the MSC, via the eNodeB 44, MME 52, and IWS 70. Upon assignment of a CDMA traffic channel, the WCD may then transition to engage in the call served over CDMA by the CDMA network 42. Here, however, rather than tearing down the WCD's bearer connection between eNodeB 44 and SGW 50, the MME may simply suspend (e.g., put on hold) the bearer connection. For instance, the MME may update its own context record for the WCD to indicate that the WCD context is "suspended" and may signal to the SGW to cause the SGW to buffer any bearer traffic arriving for the WCD rather than sending the bearer traffic to the eNodeB 44.

At block 104, the method then involves the call ending. For instance, the WCD may end the CSFB call by signaling to its currently serving CDMA BTS (e.g., a primary CDMA BTS, if the WCD is in a soft handoff state) to end the call, or if the WCD's call drops or otherwise ends. At this point, it is possible that the WCD had moved to be served by a particular BTS. For instance, when the call began, the WCD might have been served by BTS 60, but by the time the call ended, the WCD might have been served by BTS 64.

Continuing with the illustrated flow, the method then involves the occurrence of certain functions in response to the call ending. These functions may occur in response to the call ending, as the MSC 66 may trigger the start of these functions in response to the MSC determining that the call ended, such as in response to receiving a signal from the latest serving BTS indicating that the call ended.

In particular, at block 106, in response to the call ending, the method involves determining which CDMA BTS last served the WCD with the call and mapping the determined CDMA BTS to a new LTE eNodeB based at least in part on the new eNodeB being located proximate to the determined CDMA BTS. With the arrangement shown in FIGS. 2 and 3, for instance, the MSC may determine that the call ended and that BTS 64 was the BTS that last served the WCD with the call. The MSC may then signal to the IWS 70, providing the IWS with an identifier (or location) of the determined BTS 64. IWS 70 may then refer to its base station correlation data 84 to map BTS 64 to eNodeB 48 on grounds that eNodeB 48 is the closest LTE eNodeB to BTS 64, and perhaps further considering various policy considerations or other factors.

Note that in some circumstances, it is possible that the "new" eNodeB could be the same eNodeB that last served the WCD before the WCD transitioned to engage in the CSFB call. For instance, the WCD may not have moved at all and may thus still be in the same coverage when the CSFB call ends, or the WCD may have moved and returned to be served by a CDMA BTS to which the same eNodeB is the closest available eNodeB.

At block 108, the method then involves the LTE network updating the record of the bearer connection at the SGW 50 to point to the new eNodeB, namely eNodeB 48. For instance, once the IWS 70 identifies eNodeB 48 as being the new eNodeB, the IWS may signal to the MME 52 to notify the MME 52 of the identified eNodeB. And the MME may treat that signal from the IWS in much the same way that the MME would if the MME had received a path switch request from a target eNodeB if the WCD were handing off from one eNodeB to another during LTE service. Namely, the MME may responsively transmit to the SGW 50 a modify bearer request, providing the SGW with the address or other identifier of the new eNodeB 48 and an identity of the bearer connection to be switched. And the SGW may responsively update its bearer table to indicate for the WCD that the SGW will be communicating with that particular eNodeB 48 instead of with eNodeB 44, and may transmit to the MME a modify bearer response.

Optimally, the LTE network may update its record of the bearer connection at the SGW 50 to point to the new eNodeB 48 before the LTE network then receives from the WCD a request to attach with the new eNodeB 48. However, in some circumstances, the pre-provisioning of the bearer connection may occur in parallel with receipt of such an attach request, without the need to be in response to receipt of such an attach request. In any event, eNodeB 48 may then at some point receive an attach request from the WCD seeking to be served by the eNodeB 48.

At block 110, upon receiving the attach request from the WCD, the method then involves the LTE network provisioning the new eNodeB 48 with a record of the bearer connection pointing to the SGW 50. For instance, when the eNodeB 48 receives the attach request and forwards it to the MME, the MME may determine that the a bearer connection for the WCD has already been pre-provisioned with the eNodeB 48, and the MME may therefore respond to the eNodeB 48 with an attach accept message providing the bearer connection identifier (and perhaps providing the address or other identifier of the SGW), and the eNodeB 48 may send a corresponding attach accept message to the WCD and allocate a radio bearer identity for use by the WCD. Further, the MME may signal to the SGW 50 to discontinue the suspension of the bearer, so that the SGW 50 may begin transmitting any packet data destined to the WCD.

In turn, at block 112, the method then involves the LTE network using the bearer connection between the new eNodeB 48 and the SGW 50 in serving the WCD. For instance, as the WCD transmits bearer traffic to the eNodeB 48, the eNodeB may transmit that traffic over the bearer connection to the SGW 50 for transmission in turn on the packet switched network 56. Likewise, as the SGW 50 receives incoming bearer traffic destined to the WCD, the SGW 50 may transmit that bearer traffic over the bearer connection to the eNodeB 48 for transmission in turn to the WCD.

Exemplary embodiments have been described above. Those skilled in the art will understand, however, that changes and modifications may be made to these embodiments without departing from the true scope and spirit of the invention.

We claim:

1. In a hybrid wireless communication system comprising a first access network and a second access network, a method comprising:

the first access network providing connectivity with at least one transport network;

the second access network serving a wireless communication device (WCD) with a call, and the call ending;

responsive to the call ending, (i) determining which base station of the second access network most recently served the WCD, (ii) using a location of the determined base station as a basis to identify a nearby base station of the first access network, and (iii) the first access network pre-provisioning for the WCD a bearer connection with the identified base station before the WCD then requests to be served by the identified base station, wherein pre-provisioning the bearer connection with the identified base station comprises pre-provisioning the bearer connection to be between the identified base station and a gateway of the first access network by updating a record of the bearer connection at the gateway to point to the identified base station; and thereafter wirelessly receiving into the identified base station of the first access network, from the WCD, a request for the WCD to be served by the identified base station, and granting the request, wherein the pre-provisioned bearer connection with the identified base station is then used in serving the WCD.

2. The method of claim 1, wherein the system further includes an intermediary between the first access network and the second access network, the method further comprising:

the second access network reporting to the intermediary an indication of the determined base station that most recently served the WCD;

based on the reported indication, the intermediary performing a data lookup to map the determined base station to the nearby base station of the first access network; and the intermediary informing the first access network of the identified nearby base station of the first access network, so as to enable the first access network to pre-provision the bearer connection.

3. The method of claim 1, wherein pre-provisioning the bearer connection to be between the identified base station and the gateway comprises:
   transmitting to the gateway a signal providing the gateway with an address of the identified base station for the bearer connection; and
   updating the record based on the signal.

4. The method of claim 3, further comprising:
   after wirelessly receiving into the identified base station from the WCD the request for the WCD to be served by the identified base station, informing the identified base station of the pre-provisioned bearer connection between the identified base station and the gateway, to facilitate use of the pre-provisioned bearer connection in serving the WCD.

5. The method of claim 1, further comprising:
   before the second access network serves the WCD with the call, a first base station of the first access network serving the WCD and the first access network having, for the WCD, a first bearer connection between the first base station and the gateway of the first access network,
   wherein the WCD transitions from being served by the first base station of the first access network to being served with the call by the second access network, and
   wherein pre-provisioning the bearer connection with the identified base station comprises setting up the pre-provisioned bearer connection between the identified base station and the gateway in place of the first bearer connection between the first base station and the gateway.

6. The method of claim 5, further comprising the first access network suspending the first bearer connection when the WCD transitions from being served by the first base station to being served with the call by the second access network.

7. The method of claim 5, wherein the call is a circuit-switched fallback call.

8. The method of claim 1, wherein the first access network serves the WCD over a Long Term Evolution (LTE) air interface, and wherein the second access network serves the WCD with the call over an air interface selected from the group consisting of a Code Division Multiple Access (CDMA) air interface and a Global System for Mobile Communications (GSM) air interface.

9. In a wireless communication system comprising a first radio access network (RAN) having a plurality of first base stations operating according to a first air interface protocol and a second RAN having a plurality of second base stations operating according to a second air interface protocol, a method comprising:
   the first RAN serving a wireless communication device (WCD), wherein communications flow between the WCD and a gateway of the first RAN via a given one of the first base stations and a bearer connection between that given first base station and the gateway, wherein the gateway has a record of the bearer connection pointing to the given first base station; while the first RAN is serving the WCD, the second RAN setting up a call for the WCD, and (i) the WCD then transitioning from being served by the first RAN to being served with the call by the second RAN and (ii) the first RAN suspending the bearer connection;
   the call then ending;
   responsive to the call then ending, (a) determining which second base station last served the WCD with the call and mapping the determined second base station to a new first base station of the first RAN based at least in part on the new first base station being located proximate to the determined second base station and (b) the first RAN updating the record of the bearer connection at the gateway to point to the new first base station instead of to the given first base station, before then receiving a request from the WCD to attach with the new first base station; and
   upon receiving the request from the WCD to attach with the new first base station, the first RAN provisioning the new first base station with a record of the bearer connection pointing to the gateway, the first RAN granting the request to attach, and the first RAN using the bearer connection between the new first base station and gateway in serving the WCD.

10. The method of claim 9, wherein mapping the determined second base station to the new first base station of the first RAN based at least in part on the new first base station being located proximate to the determined second base station comprises an interworking server performing the mapping, the method further comprising:
    the interworking server sending to a controller of the first RAN a message specifying the new first base station; and
    responsive to the message, the controller of the first RAN signaling to the gateway to cause the gateway to update the record of the bearer connection to point to the new first base station instead of to the given first base station.

11. The method of claim 10, wherein the first RAN is a Long Term Evolution (LTE) RAN, wherein the controller is a mobility management entity (MME), and wherein the gateway is a serving gateway (SGW).

12. The method of claim 11, wherein the second RAN is a circuit switched RAN, and the call is a circuit-switched fallback call.

13. A hybrid wireless communication system comprising:
    a first radio access network (RAN) having a plurality of first base stations configured to serve wireless communication devices (WCDs) according to a first air interface protocol, the first RAN further having a serving gateway configured to exchange packet data with served WCDs over bearer connections between the gateway and the first base stations, and a first control server configured to set up the bearer connections for WCDs; and
    a second RAN having a plurality of second base stations configured to serve WCDs according to a second air interface protocol, the second RAN further having a second control server for controlling calls served by the second RAN,
    wherein, when the second RAN serves a given WCD with a call and the call ends, the hybrid wireless communication system responds to the ending of the call at least in part by (a) determining which second base station last served the given WCD with the call, (b) identifying a first base station based at least in part on proximity of the first base station to the determined second base station, and (c) pre-provisioning the gateway with a bearer connection to the identified first base station in anticipation of the identified first base station receiving an attach request from the given WCD, wherein pre-provisioning the bearer connection comprises updating a record of the bearer connection at the gateway to point to the identified base first station.

14. The hybrid wireless communication system of claim 13, further comprising an interworking server (IWS) configured to pass signaling messages between the first RAN and the second RAN, wherein the IWS is configured to receive from the second controller an indication of the second base station that last served the given WCD with the call, the IWS is configured to identify the first base station based at least in part on proximity of the first base station to the indicated second base station, and the IWS is configured to inform the first controller of the identified first base station, and wherein the first controller is configured to pre-provision the gateway with the bearer connection to the identified first base station by transmitting to the gateway an indication of the identified first base station, to cause the gateway to update the record based on the indication.

15. The hybrid wireless communication system of claim 14, wherein, when the identified first base station receives the attach request from the given WCD, the identified first base station forwards the attach request to the first controller, and the first controller responsively informs the identified first base station of the pre-provisioned bearer connection with the gateway, so as to cause the identified first base station to communicate over the bearer connection for the given WCD.

16. The hybrid wireless communication system of claim 13, wherein the first air interface protocol is Long Term Evolution (LTE), and wherein the second air interface protocol is either Code Division Multiple Access (CDMA) or Global System for Mobile Communications (GSM).

17. The hybrid wireless communication system of claim 16, wherein the first controller is a mobility management entity, and wherein the second controller is a mobile switching center.

18. The hybrid wireless communication system of claim 17, wherein the call is a circuit-switched fallback call.

* * * * *